United States Patent [19]

Suzuki et al.

[11] Patent Number: 5,285,341
[45] Date of Patent: Feb. 8, 1994

[54] THIN FILM MAGNETIC HEAD

[75] Inventors: Takashi Suzuki; Toru Matsuda, both of Yokohama; Fujihiro Ito, Tsurugashima; Yutaka Kusano, Yokohama; Morimi Hashimoto, Wako; Kenji Makino, Yokohama, all of Japan

[73] Assignee: Canon Kabushiki Kaisha, Tokyo, Japan

[21] Appl. No.: 805,971

[22] Filed: Dec. 12, 1991

[30] Foreign Application Priority Data

Dec. 17, 1990 [JP] Japan .................. 2-402737
Dec. 17, 1990 [JP] Japan .................. 2-402738
Dec. 17, 1990 [JP] Japan .................. 2-402739

[51] Int. Cl.⁵ .............. G11B 5/265; G11B 5/17; G11B 5/31
[52] U.S. Cl. ...................... 360/121; 360/123; 360/126
[58] Field of Search ............ 360/121, 126, 123; 29/603

[56] References Cited

U.S. PATENT DOCUMENTS

| 4,685,005 | 8/1987 | Fields, Jr. | 360/121 |
| 4,752,850 | 6/1988 | Yamada et al. | 360/121 |
| 4,803,571 | 2/1989 | Fujioka et al. | 360/121 |
| 4,805,051 | 2/1989 | DeMarco et al. | 360/121 |
| 4,933,795 | 6/1990 | Nigam | 360/121 |
| 5,041,936 | 8/1991 | Hayakawa | 360/121 |

Primary Examiner—Robert S. Tupper
Attorney, Agent, or Firm—Spencer, Frank & Schneider

[57] ABSTRACT

A thin film magnetic head for use with a magnetic recording medium having a direction of movement, includes a substrate and a plurality of magnetic read/write cores disposed on the substrate. At least a part of each core is formed of a magnetic thin film deposited on the substrate. Each of the cores includes a magnetic gap disposed between the magnetic read/write core and the substrate, the magnetic gaps being aligned with each other in the same position relative to the direction of movement of the magnetic recording medium. Each magnetic gap is separated an identical distance from the substrate, and each of the cores has a different width for forming a different width track on the magnetic recording medium.

12 Claims, 10 Drawing Sheets

THIN FILM MAGNETIC HEAD

BACKGROUND OF THE INVENTION

1. Field of the Invention

The present invention relates to a magnetic head that can record or reproduce in a plurality of track formats having different average track pitches.

2. Description of the Prior Art

Recently, there has been increasing requirement for magnetic disk drives for high density recording that can be used as external storages or image recording devices of a computer.

Floppy disk drives which are extensively used as external memories increase their recording density, for example, by shortening the recording wavelength so as to increase the line recording density.

Today, small diameter, metal coated video floppy disks are used in electronic still video devices and in data recording devices, which use an identical record format.

Figure 1:
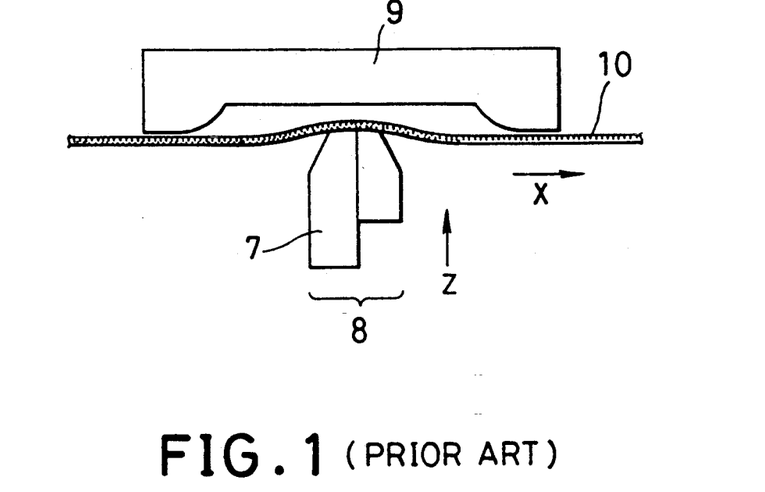
FIG. 1 is a partially cross-sectional view illustrating a head touching mechanism of a conventional video floppy disk.

FIG. 1 is a schematic cross sectional view showing a head contacting mechanism of a conventional video floppy disk drive. In this figure, a video floppy disk 10 rotates in the X direction at a high speed of 3600 rpm, and hence, sliders commonly employed for supporting the floppy disk 10 at both surfaces thereof are not used. Instead, a head 8 is pressed in the Z direction by using air pressure produced by a backing plate 9 and, with the elasticity of the floppy disk 10, a good head contact can be achieved.

As another method, a negative pressure pad method is also adopted utilizing a negative pressure, which is produced by a backing plate provided at the same side as a head with respect to a floppy disk, in order to press the floppy disk to the head.

In either method, the area of a sliding portion at the tip of a head is not more than 100,000 $\mu m^2$ (for example, 300 $\mu m \times 300$ or less), which is smaller than that of other types of floppy disk heads.

The current recording format of floppy disks for electronic still video apparatuses is specified as follows: the track pitch is 100 $\mu m$; the track width is 60 $\mu m$; the number of tracks concentrically formed on a floppy disk is 50; and each track can store one field.

Two types of recording heads are available for such recording and reproducing apparatuses: a 1-track video head; and a 2-track video head. The 1-track video head includes one magnetic core whose track width is 60 $\mu m$, and whose sliding width on a floppy disk is less than 100 $\mu m$ in the track width direction, so that 1-field image or one track can be recorded or reproduced without moving the head. On the other hand, the 2-track video head includes two magnetic cores which are separated 100 $\mu m$ apart, each having a track width of 60 $\mu m$, so that 1-frame image or two tracks can be simultaneously recorded or reproduced withou moving the head.

Figure 2:
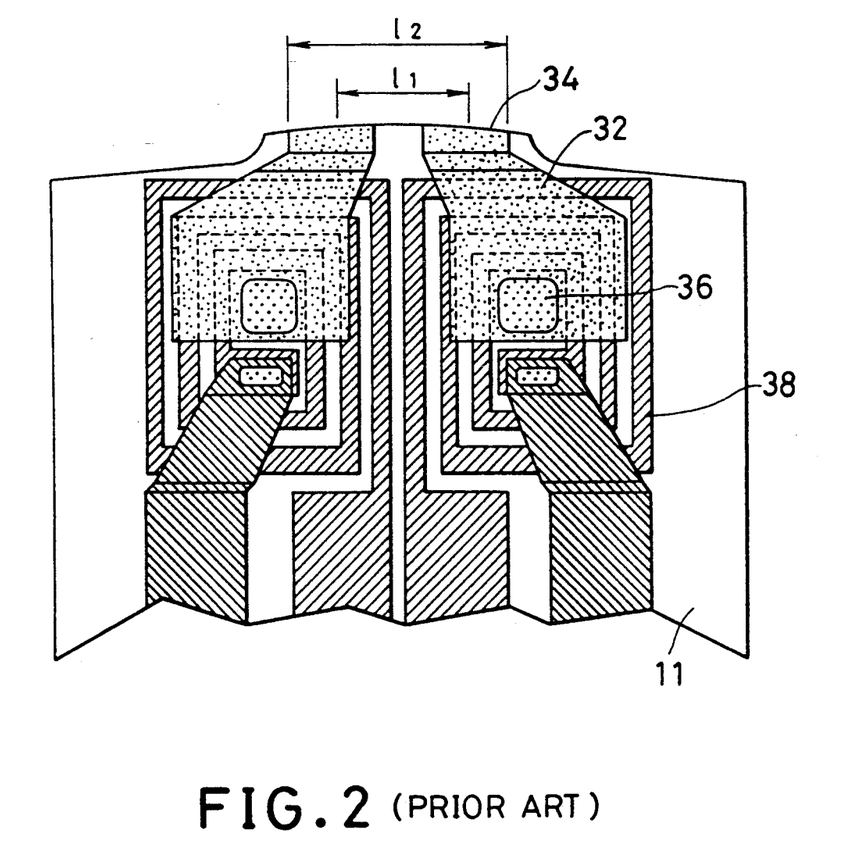
FIG. 2 is a plan view showing an arrangement of a conventional thin film magnetic head.

FIG. 2 is a view showing an arrangement of a conventional thin film head as an example of the 2-track video head. This head is fabricated as follows:

First, a bottom magnetic layer made of a soft magnetic thin film is deposited on a substrate 11, following by an insulating layer and coils 38. Subsequently, a nonmagnetic layer to be formed into magnetic gaps 34 are formed near a sliding surface, and then magnetic cores 32 making up top layers are formed in such a manner that the top layers are connected with the bottom layer through magnetic contact holes 36.

In FIG. 2, the end to end length 12 of the two tracks is specified at a rather small amount of 160 $\mu m$. The length, however, is not short enough to achieve good contact between the sliding surface of the head and a floppy disk when compared with a 1-track head that performs recording to and reproducing from a 60 $\mu m$ wide track. It is preferable that the length 12 be made as short as possible.

On the other hand, in floppy disk drives extensively used as external storage with computers, efforts for improving track density are made so as to increase memory capacity by using a high output metal as a coating material.

In such a case, there arises a new problem that a disk drive for a high track density (i.e., a narrow track pitch) floppy disk must be capable of recording to and reproducing from a conventional low track density (i.e., a wide track pitch) floppy disk. In other words, compatibility of recording and reproducing with a low-level format is required.

Figure 3:
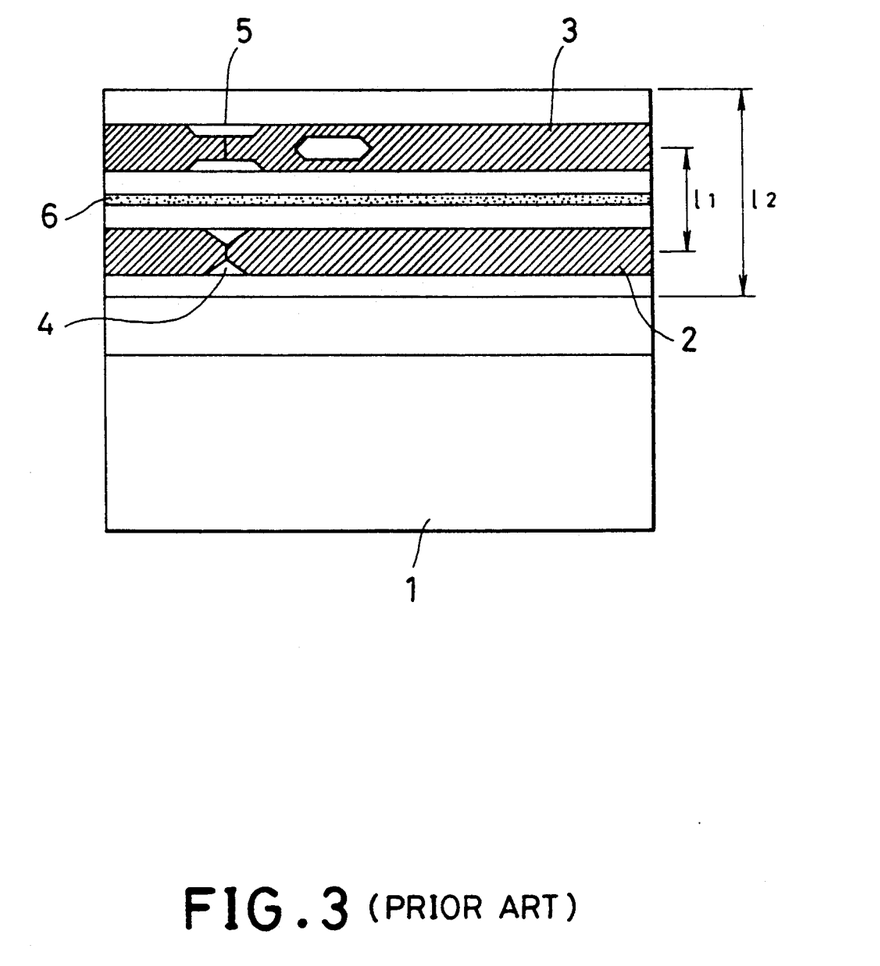
FIG. 3 is a schematic view showing a sliding surface of a conventional composite magnetic head.

FIG. 3 is a schematic bottom view showing a sliding surface of a conventional magnetic head used for downward compatibility, which is disclosed in Technical Research Report MR90-33 of The Institute of Electronics, Information and Communication Engineers of Japan.

This head comprises a slider 1, a high-level core 2 for recording and reproducing in a high-level format, and a low-level core 3 for recording and reproducing in a low-level format, thereby forming a 2-track composite head. The head further comprises a low-level magnetic gap 5 for recording and reproducing in a low-level format, and a high-level magnetic gap 4 which has a narrower track width than the low-level magnetic gap 5 so as to achieve high track density.

In addition, since the distance l1 between a track center of the high-level core 2 and a track center of the low-level core 3 is narrow, on the order of about 560 $\mu m$, there arises crosstalk between the cores 2 and 3 owing to flux leakage. Accordingly, a magnetic shield material 6 is inserted between the cores 2 and 3. Furthermore, it has been attempted to reduce the crosstalk by variously modifying the 3-dimensional geometry of the cores, though not shown in FIG. 3.

Figure 4:
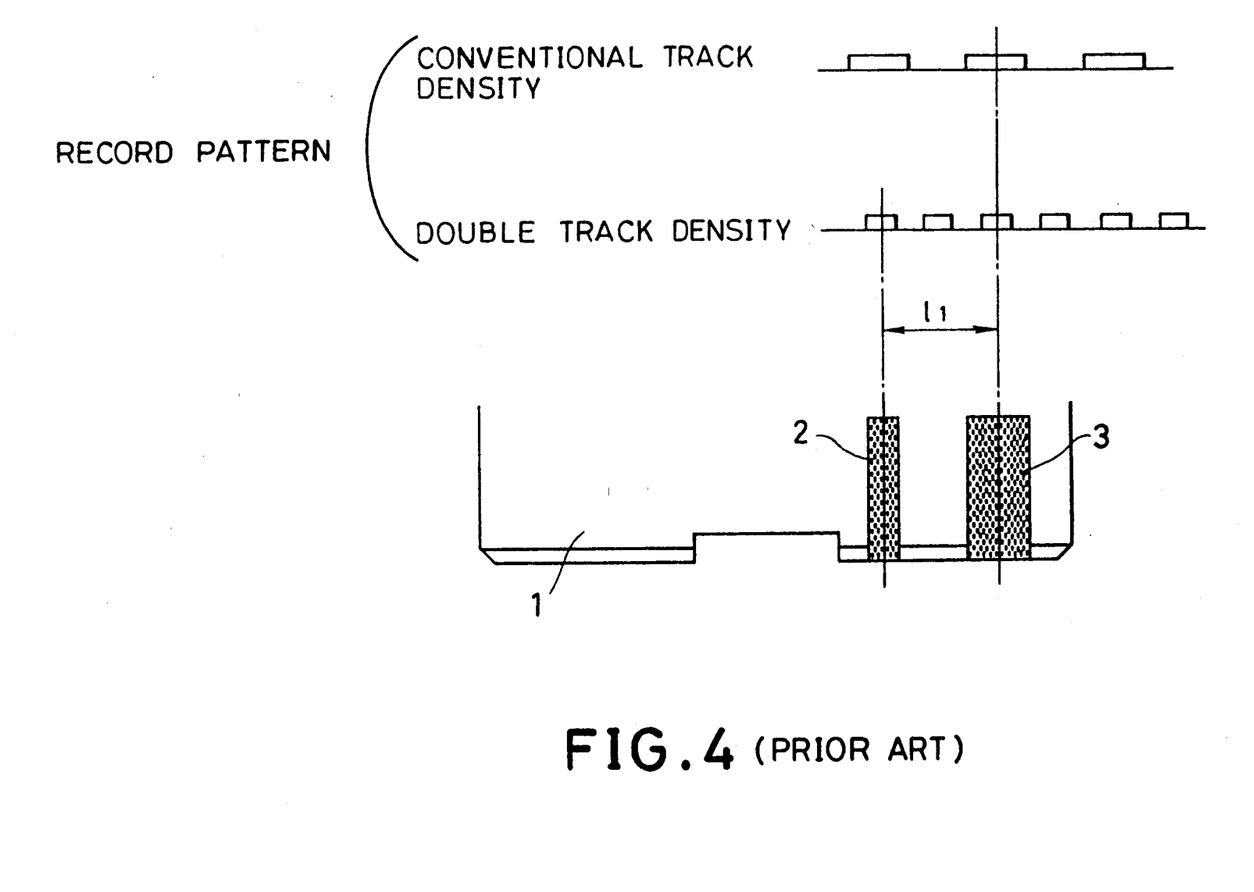
FIG. 4 is a schematic diagram illustrating a conventional technique for making compatible different formats in a floppy disk drive.

FIG. 4 is a diagram for explaining a technique whereby a disk drive for driving a double track density floppy disk is made compatible with a low-level floppy disk. The technique is disclosed in Japanese Patent Application Laying-open No. 28,913/1987.

This head comprises a slider 1, a high-level core 2 for recording and reproducing in a high-level format, and a low-level core 3 for recording and reproducing in a low-level format, thereby forming a 2-track composite head. The recording pattern of the high-level format corresponds to a double track density or a half track pitch of a conventional one. The interval l1 between a track center of the high-level core 2 and a track center of the low-level core 3 is equal to the low-level track pitch of 500 $\mu m$ in this example.

The related arts described above present the following problems:

(1) As described above, one video floppy can contain only 25 frame images, and hence, an increase in storing capacity has been required.

(2) There is a great possibility that increasing storing capacity will be achieved by narrowing track pitch owing to recent developments in medium technique. However, since the current still video standard has been extensively used, a new machine must be compatible with the current format.

(3) In a downward compatible composite head incorporating a high-level core and a low-level core, the track pitch of at least 500 μm is necessary to prevent crosstalk.

(4) In a floppy disk drive, the magnetic gap positions and azimuth angulars of a composite head as shown in FIG. 3 must be precisely controlled because a floppy disk is freely replaced. These requirements, however, decrease the efficiency of mass-production of composite heads, which in turn, increases the cost of composite heads. In particular, since a two track head is expensive in comparison with a single track head because the two track head includes twice as many assembly components like cores and coils as the single track head, the cost problem becomes more important.

(5) A 2-track composite head for a frame image has a sliding width with a floppy disk twice as wide as that of a 1-track head for a field image. For this reason, it is difficult for the two magnetic gaps of a composite magnetic head to simultaneously keep good contact with a floppy disk, thus decreasing reliability. Thus, a 2-track composite head whose track pitch is more than 500 μm cannot achieve a good head contact with a small-diameter recording medium like a video floppy which rotates at a high speed. In addition, adjustment of head contact during mass production takes a long time, and this will increase cost of the 2-track composite heads.

(6) To further shorten the recording wavelength, the rail width 12 (see, FIG. 3) of the slider 1 must be reduced so that the gap amount between the floating slider 1 and the surface of a floppy disk is limited. In addition, to ensure reliable sliding of the head while maintaining a small gap amount when the disk driving speed is large to accomplish a high transfer rate, dimensions of the slider must be small: the track pitch 11 must be set smaller than conventional values of 500-600 μm. This increases the crosstalk between the cores, and so, makes it difficult to maintain a certain signal quality. Moreover, space for providing a magnetic shield becomes very small, and so it becomes difficult to take effective steps for preventing crosstalk.

SUMMARY OF THE INVENTION

Accordingly, it is a first object of the present invention to provide a magnetic head that can solve above-described problems.

A second object of the present invention is to provide a magnetic head of low cost, having good electromagnetic conversion characteristics.

A third object of the present invention is to provide a magnetic head that can record and reproduce data in two different track formats corresponding to different track pitches, and that can achieve highly reliable recording and reproducing with good head contact with a recording medium.

To accomplish the first and second objects of the present invention, a first aspect of the present invention provides a thin film magnetic head comprising: a substrate; and a plurality of magnetic cores parallelly disposed on the substrate, at least a part of the magnetic cores being formed of a magnetic thin film deposited on the substrate, each of the plurality of magnetic cores including a magnetic gap parallel with a top surface of the substrate and separated an identical distance apart from the top surface, and each of the plurality of magnetic cores having a different track width.

With the first aspect of the present invention having the above construction, a plurality of magnetic cores can be formed at the same time, and hence, an inexpensive head can be realized. In addition, crosstalk between the cores is small, thereby achieving a good electromagnetic conversion characteristic.

To accomplish the first and second objects of the present invention, a second aspect of the present invention provides a magnetic head for recording information on a recording medium in the form of tracks at a first average track pitch or at a second average track pitch which is smaller than the first average track pitch, and for reproducing information from tracks formed on a recording medium at the first average track pitch or at the second average track pitch, the magnetic head comprising: a first magnetic core; and a second magnetic core whose track width is different from that of the first magnetic core, wherein a distance between a track center of the first magnetic core and a track center of the second magnetic core is greater than the second average track pitch, and is smaller than the first average track pitch.

With the second aspect of the present invention having the above construction, separation between the two cores can be narrowed as long as crosstalk between the cores is tolerable. Thus, head contact with a recording medium can be improved, resulting in reliable recording and reproduction.

To accomplish the third object of the present invention, a third aspect of the present invention provides a thin film magnetic head comprising: a substrate; and a plurality of magnetic cores parallelly formed on the substrate, at least a part of the plurality of magnetic cores being formed of a magnetic thin film deposited on the substrate, wherein track widths of the plurality of magnetic cores are different from each other, wherein each of the plurality of the magnetic cores comprises a top core and a bottom core which are magnetically coupled by a magnetic contact hole, the top core and bottom core being provided with a sliding surface that slides on a surface of a magnetic recording medium, and wherein a distance between the magnetic contact hole and the sliding surface is different in the plurality of magnetic cores.

This head can realize a good electromagnetic conversion characteristic independently of a track width, by optimizing the winding number of the coils and the structure of the magnetic cores.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The embodiments of the invention will now be described with reference to the accompanying drawings.

EMBODIMENT 1

Figure 5:
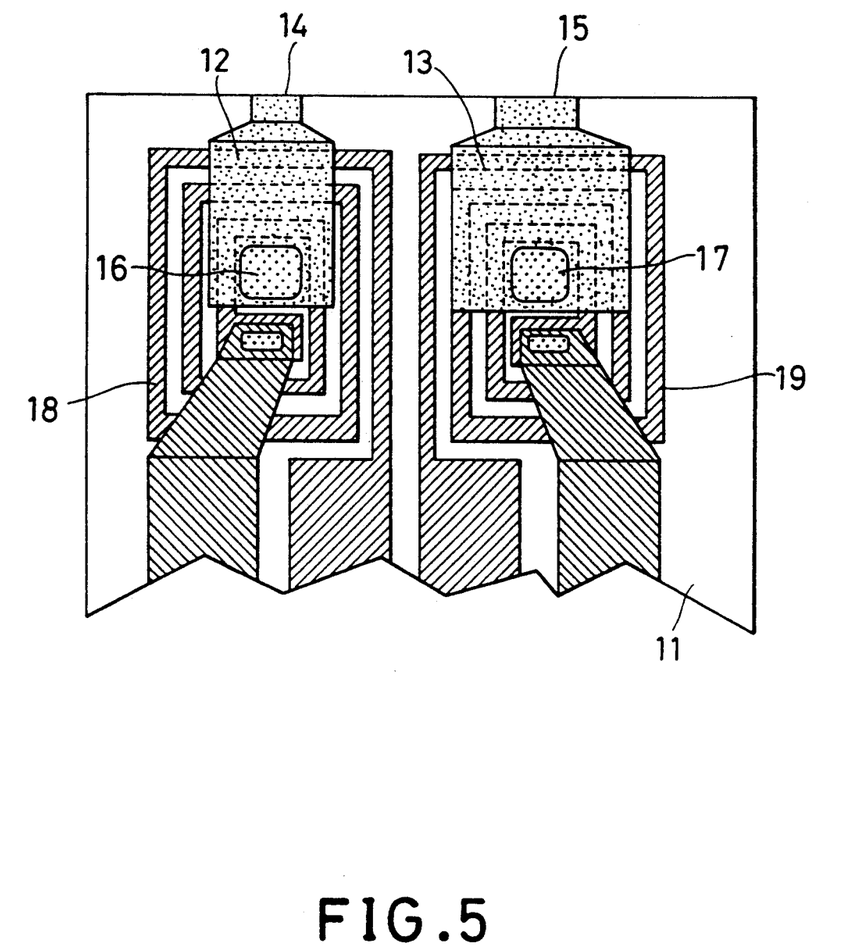
FIG. 5 is a plan view showing an arrangement of a first embodiment of a thin film magnetic head according to the present invention.

FIG. 5 is a view showing an arrangement of a patterned side of a first embodiment of a thin film magnetic head according to the present invention. The fabrication process of the head is as follows:

First, a high-level coil 18 and a low-level coil 19 are formed, by using thin film deposition and photolithography, on an insulating layer (not shown) formed on a substrate (a bottom magnetic layer) 11 which is made of a magnetic board or of a board on which a magnetic film is formed. Subsequently, a high-level magnetic gap 14 and a low-level magnetic gap 15 are formed, followed by the formation of a high-level magnetic contact hole 16 and a low-level magnetic contact hole 17. Then, a high-level magnetic core 12 and a low-level magnetic core 13 are formed on the coils 18 and 19, respectively. The patten widths of the high-level core 12 and the low-level core 13 are different so that a pair of tracks of different track widths are formed. Finally, a protective layer is formed on the substrate 11 on which the above layers are formed so as to cover and protect these layers.

Figure 6:
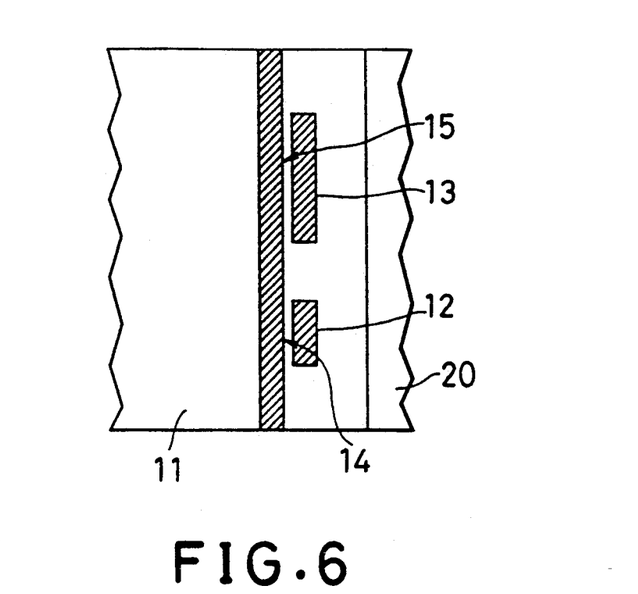
FIG. 6 is a schematic view showing an arrangement of a recording medium sliding surface of the thin film magnetic head shown in FIG. 5.

FIG. 6 is a schematic view showing a structure of a recording medium sliding surface of the thin film magnetic head of FIG. 5. The sliding surface is processed into a slider after a protective plate 20 is disposed on the protective layer.

The head of this embodiment, having such a structure, can sufficiently reduce crosstalk because the magnetic cores 12 and 13 are arranged side by side, and therefore, a facing area (side areas of the cores 12 and 13) of the high-level and low-level head elements is much smaller than in the conventional composite head, even if the track pitch is less than 500 μm. In addition, since the magnetic gaps 14 and 15 of the cores 12 and 13 are aligned on the same plane, relative gap positions and azimuth angles are established with high accuracy. Moreover, since counterparts of the two head elements, such as the cores 12 and 13, and the coils 18 and 19 are made during the same process, the 2-track head is fabricated at nearly the same cost as a 1-track head.

Although the bottom magnetic core is shared by the two head elements in the example above, each head element can have an independently patterned bottom core. According to a simulation of the inventors of the present invention, the crosstalk increases consistently with the ratio of a core length (a length from the magnetic gap to the magnetic contact hole) to the track pitch. In an arrangement in which a plurality of cores are disposed in parallel, the core length must be lengthened so as to restrict a total width of the head, and hence, independent bottom magnetic cores are very effective for decreasing crosstalk because this will hinder the magnetic flux passing across the two cores.

EMBODIMENT 2

Figure 7:
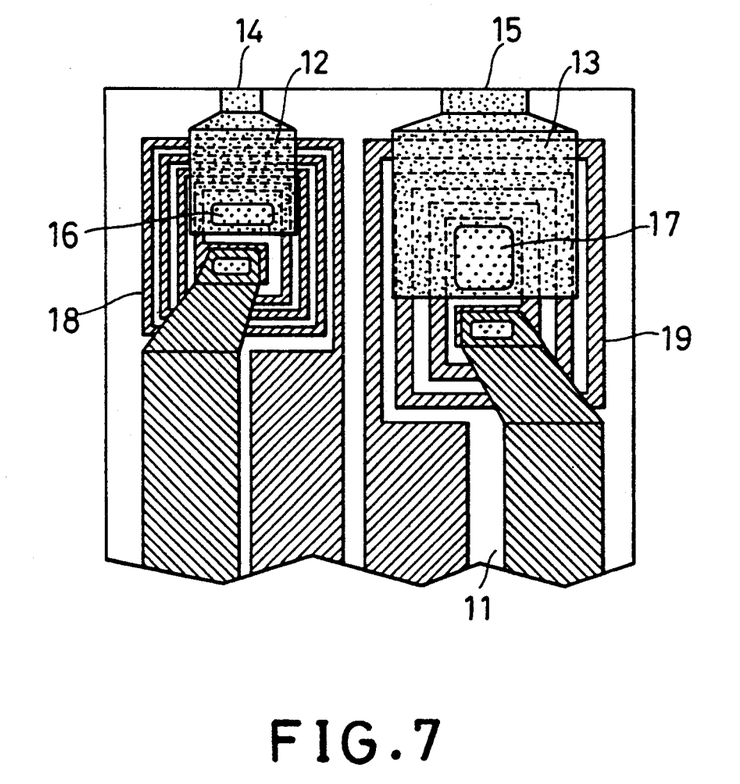
FIGS. 7-11 are plan views showing arrangements of a second to a sixth embodiments of a thin film magnetic heads according to the present invention, respectively.

FIG. 7 is a view showing an arrangement of a second embodiment of a thin film magnetic head according to the present invention.

This head is formed by modifying the geometry of the components of the thin film magnetic head of FIG. 5: areas of contact holes 16 and 17 of a high-level core 12 and a low-level core 13, positions of the contact holes 16 and 17 with regard to a magnetic gap, and the winding numbers of a high-level coil 18 and a low-level coil 19 are specified as follows in accordance with track widths of a high-level magnetic gap 14 and a low-level magnetic gap 15.

Generally, a reproduced output of a magnetic head increases approximately linearly with a track width, and an inductance for a unit turn also increases with a track width. For this reason, the winding number of the high-level coil 18 for the high-level format (the narrow track) is made larger than that of the low-level coil 19 for the low-level format (the wide track) so that the S/N ratio of the reproduced signal is improved.

Considering magnetic saturation of a core, the area of a contact hole can be made smaller as the track width decreases. The reason for this is as follows: an amount of magnetic flux is proportional to a width of a magnetic gap, i.e., a track width; thus, when the width of the magnetic gap is small, a maximum magnetic flux is small, and hence, magnetic saturation does not occur even if the contact hole is small. Therefore, the space for the coil can be enlarged by an amount corresponding to the reduction of the contact hole. This makes it possible not only to increase the winding number of the coil, but also to prevent the miniaturization of the coil pattern and the increase in the electric resistance of the coil.

More specifically, in the thin film magnetic head of FIG. 7, the dimensions of the high-level core 12 are made smaller than that of the low-level core 13, and the winding number of the high-level coil 13 is made greater than that of the low-level coil 19. In addition, the area of a high-level contact hole 16 for the high-level core 13 is smaller than that of a low-level contact hole 17 for the low-level core 13. Furthermore, the distance between the high-level contact hole 16 and the magnetic gap 14 is shorter than that between the low-level contact hole 17 and the magnetic gap 15.

The thin film magnetic head of FIG. 7 has the following advantages in addition to the effects of the thin film magnetic head of FIG. 5: first, the high-level core 12 can perform high S/N ratio recording and reproduction; and second, a better electromagnetic conversion characteristic can be obtained because the electrical resistance of the coil pattern can be suppressed by an amount corresponding to the reduction of the area of the high-level contact hole 16. Moreover, since the distance between the high-level contact hole 16 and the magnetic head gap 14 of FIG. 7 is smaller than that of FIG. 5, the crosstalk between the cores 12 and 13 can be reduced by the amount corresponding to that distance.

EMBODIMENTS 3 AND 4

Figure 8:
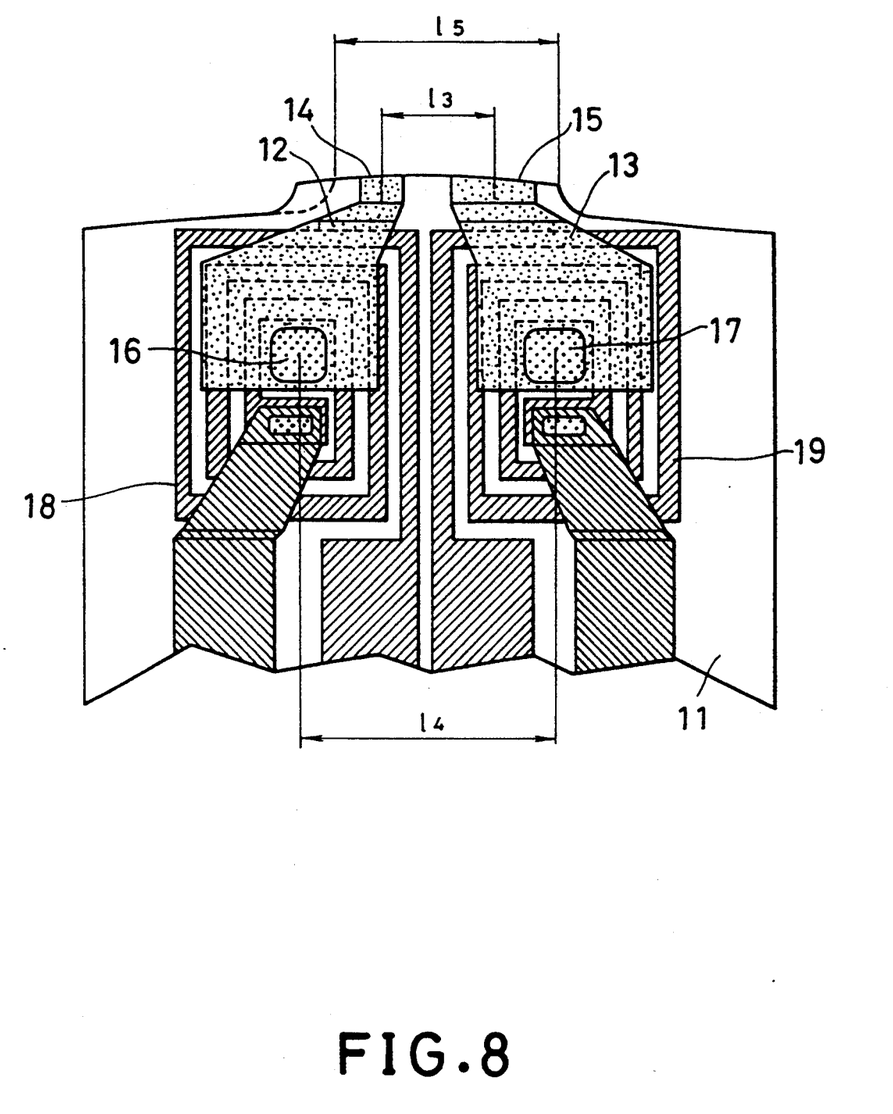
Figure 9:
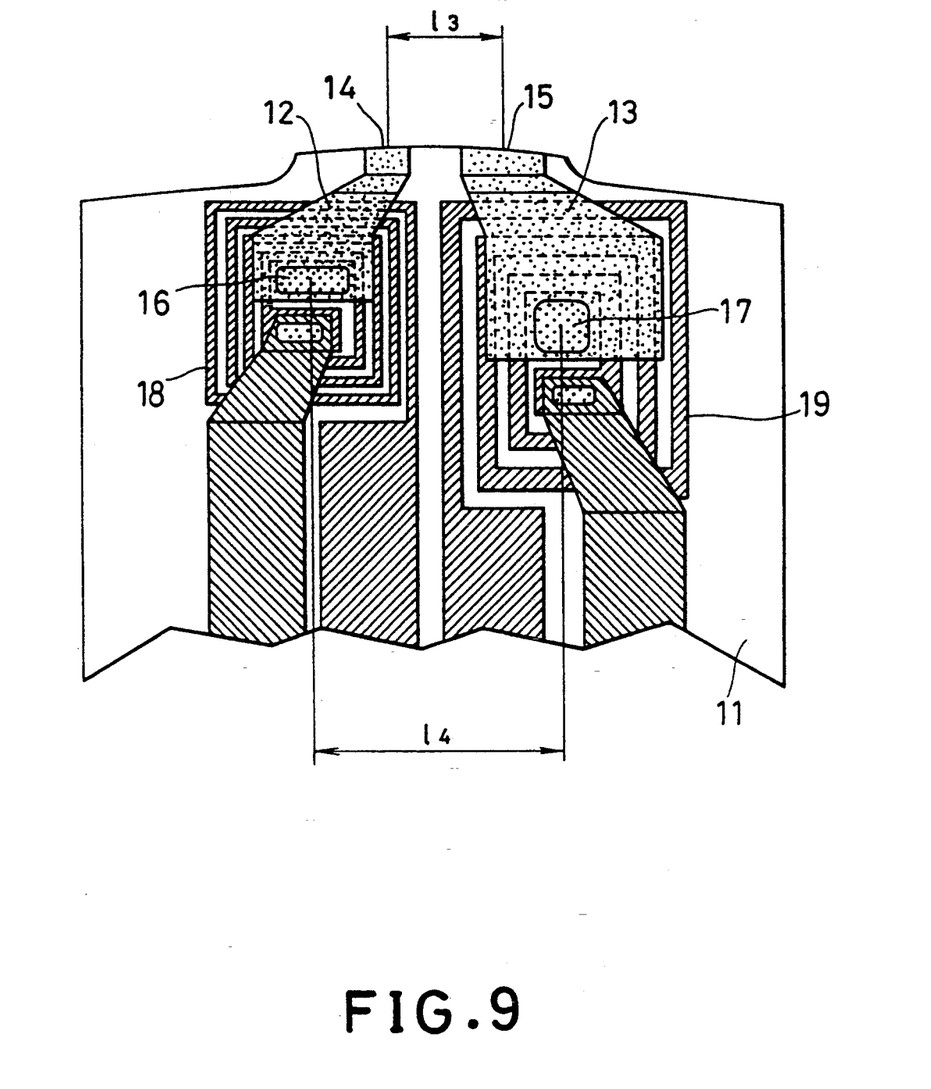

FIGS. 8 and 9 are views showing a third and a fourth embodiment of a thin film magnetic head according to the present invention, respectively.

Heads of FIGS. 8 and 9 are differentiated from those of FIGS. 5 and 7 in that the separation 14 between contact holes 16 and 17 is made longer than the separation between the magnetic gaps 14 and 15, thereby shortening the separation 13. Therefore, the heads of FIGS. 8 and 9 can record or reproduce a comparatively high density two tracks at the same time.

EMBODIMENT 5

Figure 10:
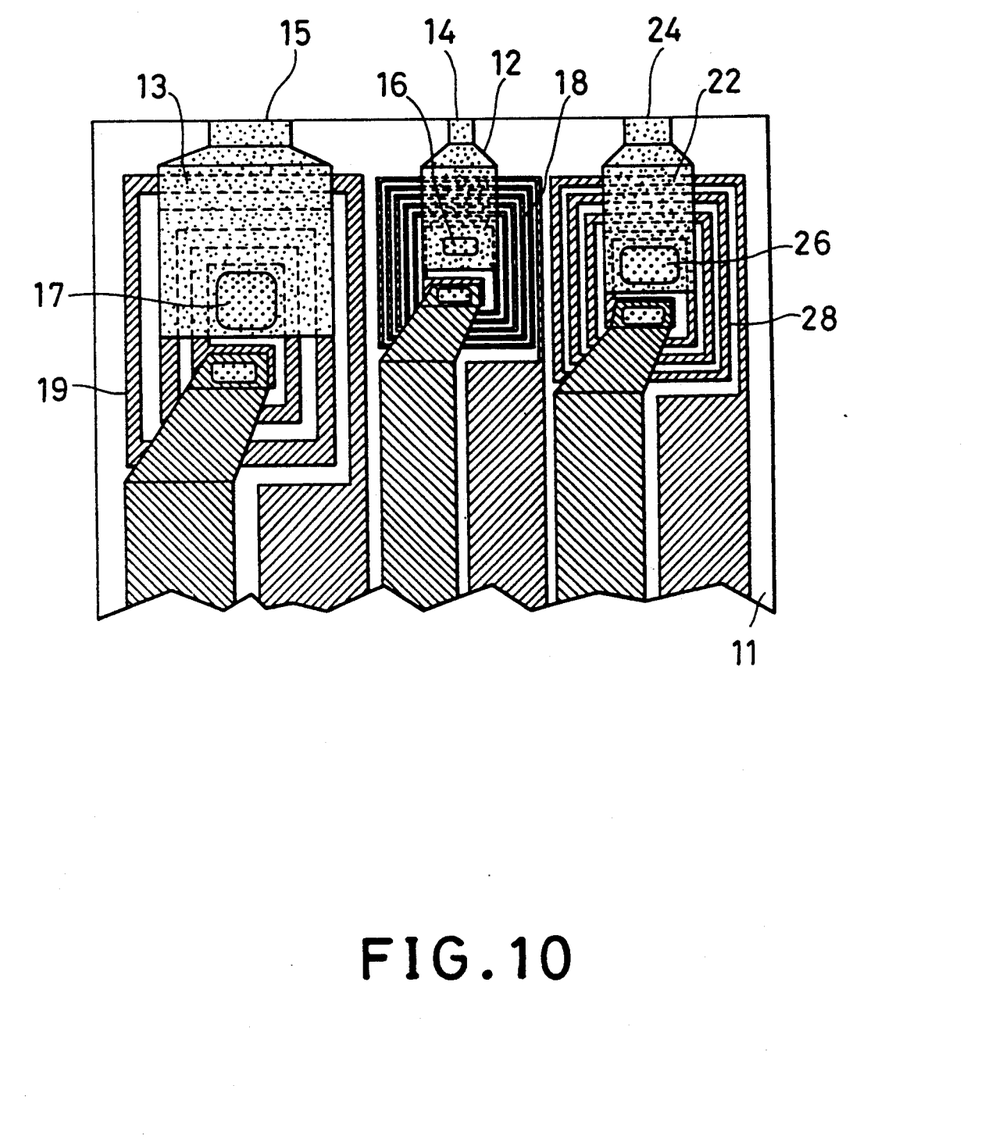

FIG. 10 is a view showing an arrangement of a fifth embodiment of a thin film magnetic head according to the present invention. Three(higher-to-lower level) cores 12, 13 and 22 are formed on a substrate 11, and magnetic gaps 14, 15 and 24, each of which has different track width, are formed corresponding to the cores 12, 13 and 22, respectively.

In this embodiment, since the cores 12, 13 and 22 have each different track width, not only the geometry of the core 12, 13 and 22, but also the winding numbers of coils 18, 19 and 28, and areas of contact holes 16, 17 and 26 are each different. As described above referring to FIG. 7, shapes of the cores 12, 13 and 22, dimensions of the contact holes 16, 17 and 26, and winding numbers of the coils 18, 19 and 28 are specified as mentioned above so that a good electromagnetic conversion characteristic can be obtained with regard to the cores 12, 13 and 22. The thin film magnetic head of FIG. 10 can handle three formats including a higher track density format.

EMBODIMENT 6

Figure 11:
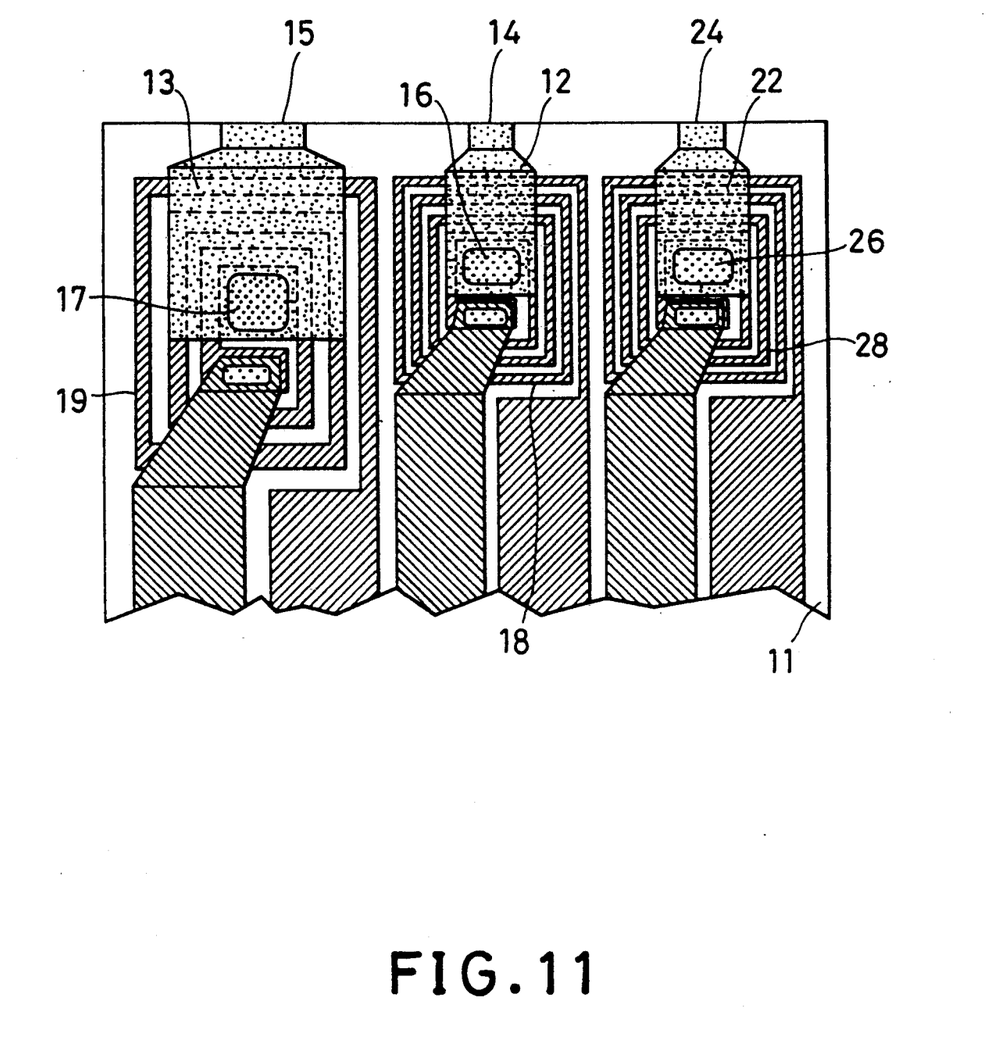

FIG. 11 is a view showing an arrangement of a sixth embodiment of a thin film magnetic head of the present invention. The magnetic head of FIG. 11 is similar to that of FIG. 10 in that a third magnetic core 22 is formed, but is different in that the third magnetic core 22 has the same track width and geometry as those of a high-level core 12. In addition, geometries of coils 18 and 28 are identical, and areas of the contact holes 16 and 26 are also equal. On the other hand, the track width of the high-level core 12 and the third core 22 is narrower than that of a low-level core 13. Furthermore, winding numbers of the cores, and shapes and positions of the contact holes are specified in accordance with a track width as in the above embodiments so that a good electromagnetic conversion characteristic can be achieved.

The head of FIG. 11 thus arranged can perform 2-channel recording or reproduction in a high-level format, and hence, can cope with high-band information as well as high data rate.

Incidentally, there are two ways for achieving a high density recording: increasing track density by narrowing a track pitch; and increasing line recording density by shortening recording wavelength. The latter can be accomplished with a small increase in cost by a minimum modification of a film thickness arrangement: a gap length (a gap thickness) of a high-level element or thickness of the high-level core is differentiated from those of a low-level element in accordance with the track width so that a good electromagnetic conversion characteristic can be achieved.

The inventors of the present invention fabricated, as a high density magnetic recording medium, a prototype metal thin film magnetic recording medium including Co and Cr as major components, and combined the recording medium with the thin film recording heads of the above embodiments so as to conduct evaluations of the heads. The recording medium was formed by the sputtering process: a polyimide film such as Upilex film of Ube Industries Ltd. in Japan was used as a substrate and a Co-20 wt % Cr alloy was used as a target; and a Co-Cr vertical magnetization film was formed on the substrate with maintaining the temperature of the substrate at 200° C.

As magnetostatic characteristics of the Co-Cr vertical magnetization film, the following conditions are preferable: the saturation flux density Bs of 5,000 G; and the coercive force Hc of 800–1,500 Oe. Details of this type of recording medium is disclosed in Japanese Patent Application Laying-Open Nos. 1-102718 (1989), 1-232533 (1989) and 1-235023 (1989), which are assigned to the same assignee of the present invention.

By using the recording medium described above, high S/N ratios and good electromagnetic conversion characteristics can be achieved even in narrow track or short-wave recording. In addition, since the thin film magnetic heads of the embodiments have a small sliding area and a low weight, they can provide good head contact with a recording medium even when the recording medium is made of a rigid metal thin film, and can reduce damage to the heads and recording medium.

Figure 12:
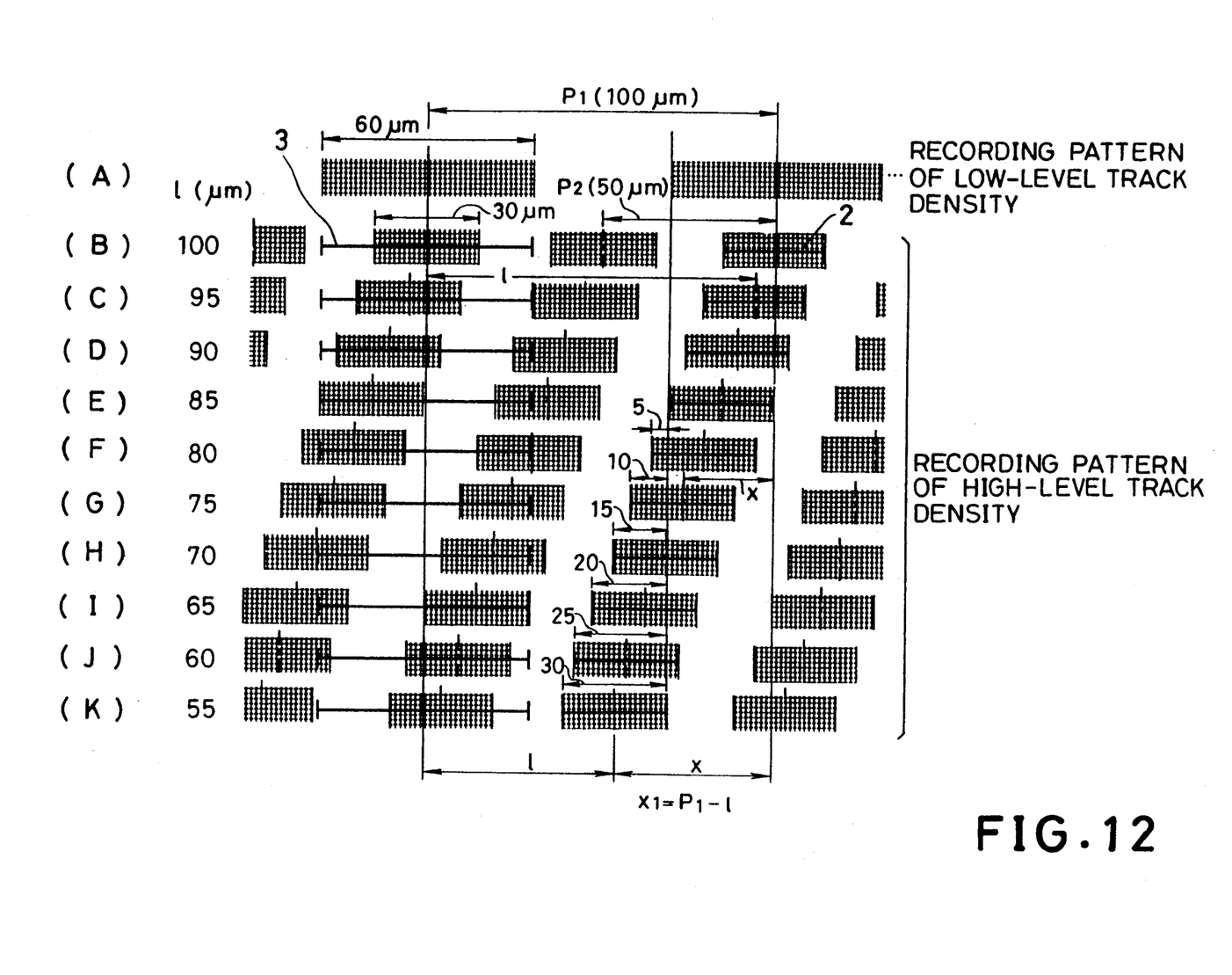
FIG. 12 is a schematic diagram illustrating a basic idea of the embodiments of the present invention.

FIG. 12 is a schematic diagram for explaining a basic concept when the thin film magnetic heads of the above embodiments are applied to an electronic still video apparatus.

In these figures, two record formats corresponding to two track pitches are considered: a record format for a low track pitch $P_1$; and a record format for a high track pitch (double density track pitch) $P_2$. In this case, track widths are each specified as 0.6 $P_1$ and 0.6 $P_2$.

Portions (B)–(K) in FIG. 12 show, in a head including a high-level core 2 and a low-level core 3 arranged in parallel, the relationships between the record formats and the separation lengths of the two cores when the separation length l (that is, the distance between the track centers of the high-level core 2 and the low-level core 3) is varied from 100 μm to 55 μm by 5 μm steps. In this figure, the position of the low-level core 3 is fixed, and the position of the high-level core 2 is shifted by 5 μm steps.

The shaded area of portion (A) in FIG. 12 shows the low-level format corresponding to 100 μm track pitch and 60 μm track width. On the other hand, the shaded areas in portions (B)–(K) in FIG. 12 show the high-level formats corresponding to 50 μm track pitch and 30 μm track width, which are recorded when the position of the low-level core 3 is fixed.

Next, let us consider the compatibility between a high-level magnetic head and a dedicated low-level magnetic head. Here, it is assumed that a dedicated low-level magnetic head has two low-level cores which have each 60 μm track width and are disposed in parallel separated 100 μm apart as shown in portion (A) in FIG. 12.

Portion (B) in FIG. 12 shows a high-level composite magnetic head, in which the separation length l between the track center of the high-level core 2 and that of the low-level core 3 is equal to the low-level track pitch $P_1$ (=100 μm). In this case, a high-level format recorded with this high-level magnetic head can be reproduced by the dedicated low-level magnetic head including two 60 μm wide low-level cores separated 100 μm apart. Conversely, two tracks of a low-level format recorded with the dedicated low-level magnetic head can be reproduced by the high-level core 2 and the low-level core 3 of the high-level composite head at the same time without moving the head.

Portions (C)–(K) in FIG. 12 show dispositions of a high-level core 2 and a low-level core 3 of each composite head of the embodiments of the present invention. At least in portions (C) to (E) in FIG. 12, two tracks of a low-level format recorded by the dedicated low-level magnetic head can be reproduced by the high-level core 2 and the low-level core 3 of the high-level composite head at the same time without moving the head. Conversely, two tracks of a high-level format recorded with high-level composite heads in portions (C)–(E) in FIG. 12 can be reproduced by the dedicated low-level magnetic head at the same time without moving the head.

Thus, the heads of portions (C)–(E) in FIG. 12 are equivalent to the head of portion (B) in FIG. 12 in terms of the compatibility with the dedicated low-level magnetic head. Furthermore, since each head of portions (C) to (E) in FIG. 12 has a smaller track pitch than the head of portion (B) in FIG. 12, the entire dimension of the head becomes smaller in the track width direction, and hence, a better head contact can be achieved, thereby accomplishing highly reliable recording and reproduction.

For each composite head whose arrangement of a low-level core and a high-level core are shown in portions (F)–(K) in FIG. 12, a similar effect can be achieved by shifting the center of the low-level core 3 to the right-hand side by 5 to 30 μm, respectively, with regard to the center of a track recorded by the dedicated low-level head, as shown in portions (A) and (F)–(K) in FIG. 12. For example, when a composite head whose core arrangement is shown in portion (H) in FIG. 12 is shifted to the right by 15 μm, the two tracks of the low-level format, which are recorded by the dedicated low-level head, as shown in portion (A) in FIG. 12, can be reproduced by the composite head of portion (H) in FIG. 12 as follows: the low-level core 2 of the head of portion (H) in FIG. 12 can reproduce with 45 μm width; and the high-level core 3 can reproduce with 30 μm width. Conversely, when two tracks of the high-level format recorded with the composite head of portion (H) in FIG. 12 are produced by the dedicated low-level head, reproduction of 45 μm width and 30 μm width can be performed.

It is clear that when recording and reproduction are carried out with the same head, or track by track, any head of portions (B)–(J) in FIG. 12 can be used without involving any problem. The separation length l between the centers of the low-level core 3 and the high-level core 2, however, must be greater than 45 μm, and preferably at least 55 μm taking account of problems of processing accuracy or crosstalk.

Generally speaking, the track width of the low-level core 3 is made greater than that of the high-level core 2, and the track pitch $P_2$ of the high-level format is made as narrow as possible in a range where no crosstalk problem arises. Therefore, the separation length l must be increased as compared with the track pitch $P_2$ by the amount corresponding to the difference between the low-level core 3 and the high-level core 2.

Next, recording and reproduction in the high-level format will be considered. In this case, both recording and reproduction are carried out only with the high-level core 2. It is not preferable that head positions of the low-level format and the high-level format be independently determined because this will unduly increase head positions to be determined, thereby complicating the head positioning mechanism.

For this reason, when the track arrangements of the high-level format (of the double track density) corresponding to composite heads whose higher-level core and low-level core are disposed as shown in portion (C)–(K) in FIG. 12, the head set position can be shared by both high-level and low-level formats. A generalization of this can be represented as $X = P_1 - l$, where l is the separation length between the centers of the two magnetic cores 2 and 3; $P_1$ is the track pitch of the low-level format; and X is the separation length between the track centers of the high-level and low-level formats. For example, in portion (E) in FIG. 12, $l = 85$ μm, and hence, $P_1 - l = 100 - 85 = 15$ μm. Thus, with regard to the head of portion (E) in FIG. 12, the difference between the centers of the low-level format and the high-level format is set at 15 μm. In this way, the head position for recording and reproduction in the low-level format can be made identical to that for recording and reproduction in the high-level format. Incidentally, to record or reproduce two tracks at the same time during a reproduction of a low-level format, a head whose high-level core and low-level core are arranged as shown in portions (C)–(E) in FIG. 12 must be used.

Heads that satisfy this condition, include the heads of FIGS. 6 and 8 of the above embodiments. In this case, the sliding portion of the head of FIG. 8 can be shortened to 15 as indicated by the broken line curve of FIG. 8.

A recordation and reproduction of a high-band still picture signal corresponding to a high-definition television signal was performed with a head of the above embodiments whose high-level core has a 30 μm track width. In addition, a recordation and reproduction of a similar high-band still picture signal was carried out by using a head whose low-level core has a 60 μm track width. In both cases, a good recordation and reproduction was executed.

As described above, in a thin film magnetic head of each embodiment, a plurality of magnetic cores whose track widths are different are formed on a common substrate with each core and coil being geometrically optimized. These heads can achieve the following effects.

Crosstalk can be reduced to a very small amount because the distances between the magnetic gap and the contact holes are restricted to a very small value required.

A good electromagnetic conversion characteristic, particularly that of the high-level core, can be obtained by optimizing the winding number of each core.

By reducing the size of the contact hole of the high-level core, a sufficient coil space can be established.

It further becomes possible to provide a composite head that has a low crosstalk characteristic with different track widths, and has a complete recording and reproduction compatibility between a high-recording density, high-transfer rate, high-level format, and a low-level format.

Because of low crosstalk, the spaces between a plurality of tracks can be easily narrowed. As a result, the width of a slider or of slider rails can be reduced, and hence, good head contact between the sliding surface of the head and a recording medium can be achieved even when the recording medium is a high-speed medium or a metal thin film medium.

Moreover, the position of a head gap can be precisely determined with no sacrifice in mass-production. In addition, a composite head that has a compatibility between a high-level format and a low-level format can be achieved with about the same cost as that of a single-track recording and reproduction head.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A thin film magnetic head for use with a magnetic recording medium having a direction of movement, the head comprising:
   a substrate; and
   a plurality of magnetic read/write cores disposed on said substrate, at least a part of said read/write cores being formed of a magnetic thin film deposited on said substrate, each of said plurality of read/write cores including a magnetic gap disposed between the read/write core and said substrate and each magnetic gap is separated an identical distance from said substrate, said magnetic gaps being aligned with each other in the same position relative to the direction of movement of the magnetic recording medium, and each of said plurality of read/write cores having a different width for forming a different width track on the magnetic recording medium.

2. A thin film magnetic head as claimed in claim 1, wherein each of said plurality of read/write cores comprises a top core and a bottom core which are magnetically coupled by a magnetic contact hole, said top core and bottom core being provided with a sliding surface that slides on a surface of the magnetic recording medium, wherein a distance between said magnetic contact hole and said sliding surface is different in said plurality of read/write cores.

3. A thin film magnetic head as claimed in claim 1, wherein each of said plurality of read/write cores has a respective coil wound thereon, said respective coils having a different winding number and/or a different cross-sectional area from each other.

4. A thin film magnetic head as claimed in claim 1, wherein each of said plurality of read/write cores comprises a magnetic layer and an insulating layer between said magnetic layer and said substrate, the thickness of said magnetic layer and the thickness of said insulating layer each being substantially equal in said plurality of read/write cores.

5. A magnetic head for recording information on a recording medium in the form of tracks at a first average track pitch or at a second average track pitch which is smaller than the first average track pitch, and for reproducing information from tracks formed on a recording medium at the first average track pitch or at the second average track pitch, said magnetic head comprising:

a first magnetic core including a first magnetic gap; and
a second magnetic core for forming a track having a width different from a track formed by said first magnetic core, and including a second magnetic gap formed on an identical surface on which said first magnetic gap is formed,
wherein a distance between a center of a portion of said first magnetic core for forming tracks at said first average track pitch and a center of a portion of said second magnetic core for forming tracks at said second average track pitch, in a direction perpendicular to the tracks, is greater than the second average track pitch, and is smaller than the first average track pitch.

6. A magnetic head as claimed in claim 5, wherein said first magnetic core performs recording or reproduction at the first average track pitch, and said second magnetic core performs recording or reproduction at the second average track pitch.

7. A magnetic head as claimed in claim 5, wherein the center of one of said tracks formed at said first average track pitch in a direction perpendicular to said tracks and the center of the track corresponding to said one of said tracks formed at said second average track pitch are shifted by (P−l), where P is the first average track pitch, and l is a distance between the center of each of said portions of the two magnetic cores.

8. A magnetic head as claimed in claim 5, wherein said first magnetic core and said second magnetic core simultaneously record or reproduce two tracks at said first average track pitch without moving said magnetic head.

9. A magnetic head as claimed in claim 5, wherein at least a part of said first magnetic core and said second magnetic core is formed of a magnetic thin film deposited on a common substrate.

10. A thin film magnetic head for use with a magnetic recording medium having a direction of movement, the head comprising:
    a substrate;
    a plurality of magnetic read/write cores formed on said substrate, at least a part of said plurality of read/write cores being formed of a magnetic thin film deposited on said substrate, said read/write cores being aligned with each other in the same position relative to the direction of movement of the magnetic recording medium; and
    a plurality of coils, each of which is wound on a respective one of said plurality of read/write cores, wherein the widths of tracks formed by said plurality of read/write cores are different from each other, and respective winding numbers of said plurality of coils are different each other.

11. A thin film magnetic head for use with a magnetic recording medium having a direction of movement, the head comprising:
    a substrate; and
    a plurality of magnetic read/write cores formed on said substrate, at least a part of said plurality of cores being formed of a magnetic thin film deposited on said substrate, said read/write cores being aligned with each other in the same position relative to the direction of movement of the magnetic recording medium,
    wherein the widths of tracks formed by said plurality of cores are different from each other, wherein each of said plurality of said cores comprises a top core and a bottom core which are magnetically coupled by a magnetic contact hole, said top core and bottom core being provided with a sliding surface for sliding on a surface of the magnetic recording medium, and wherein a distance between said magnetic contact hole and said sliding surface is different in each of said plurality of cores.

12. A thin film magnetic head for use with a magnetic recording medium having a direction of movement, the head comprising:

a substrate; and a plurality of magnetic read/write cores formed on said substrate, at least a part of said plurality of cores being formed of a magnetic thin film deposited on said substrate, said read/write cores being aligned with each other in the same position relative to the direction of movement of the magnetic recording medium, wherein the widths of tracks formed by said plurality of cores are different from each other, and wherein each of said plurality of cores comprises a top core and a bottom core which are magnetically coupled by a magnetic contact hole which is different in size for each of said plurality of magnetic cores.

* * * * *